No. 707,140. Patented Aug. 19, 1902.
A. D. ELLIOTT.
NAIL ASSORTING APPARATUS.
(Application filed June 15, 1898.)
(No Model.)
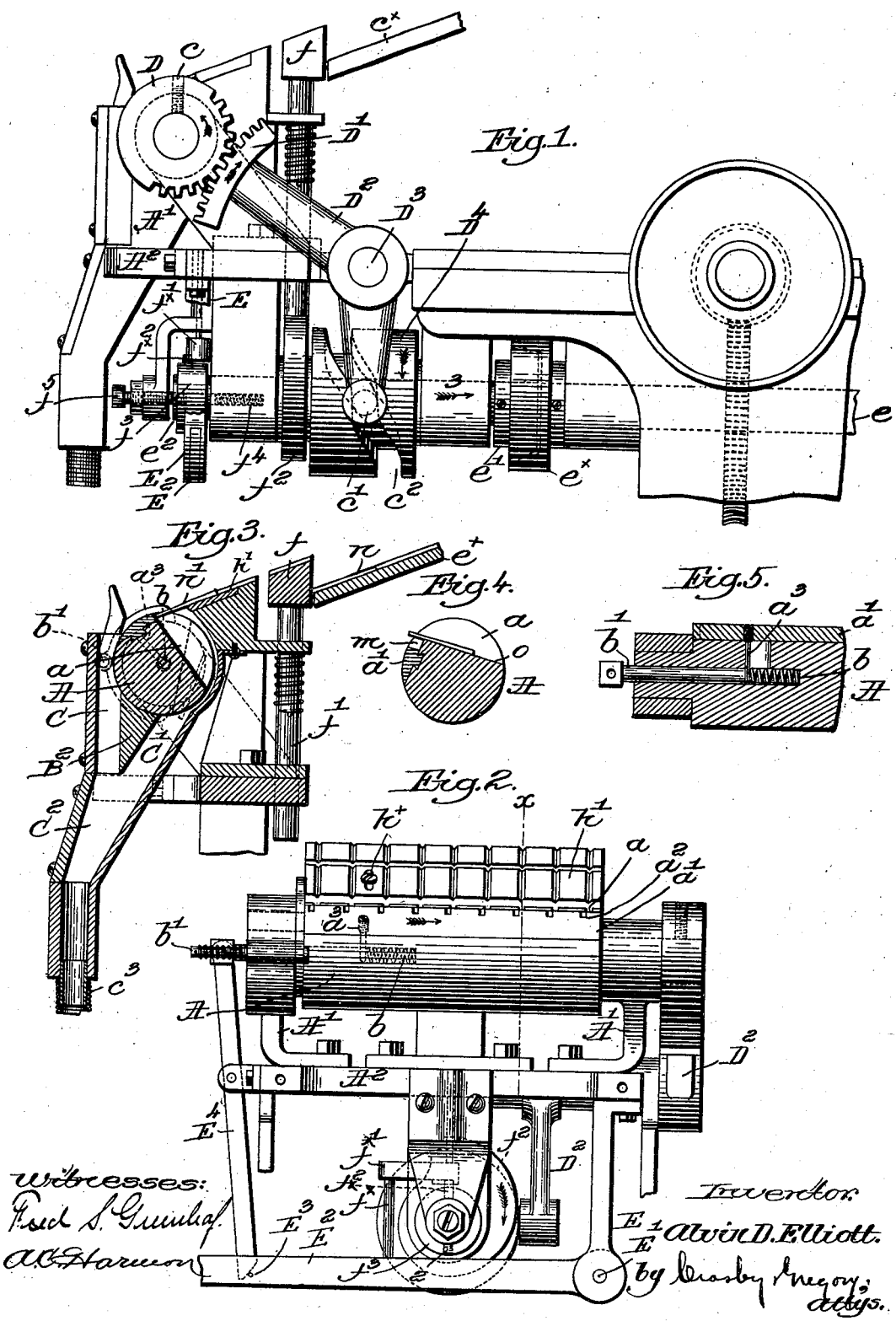

UNITED STATES PATENT OFFICE.

ALVIN D. ELLIOTT, OF LAWRENCE, MASSACHUSETTS, ASSIGNOR, BY MESNE ASSIGNMENTS, TO THE UNITED SHOE MACHINERY COMPANY, A CORPORATION OF NEW JERSEY.

NAIL-ASSORTING APPARATUS.

SPECIFICATION forming part of Letters Patent No. 707,140, dated August 19, 1902.

Application filed June 15, 1898. Serial No. 683,486. (No model.)

*To all whom it may concern:*

Be it known that I, ALVIN D. ELLIOTT, of Lawrence, county of Essex, State of Massachusetts, have invented an Improvement in Nail-Assorting Apparatus, of which the following description, in connection with the accompanying drawings, is a specification, like characters on the drawings representing like parts.

This invention has for its object the production of a novel apparatus for assorting nails for use in nailing-machines.

The nailing-machines may be used for nailing heels and other purposes; and the invention herein to be described is an improvement on the class of apparatus represented in United States Patent No. 577,213, dated February 16, 1897.

In this present invention I have illustrated a circularly-movable nail-controller or device having a series of grooves, one for each nail-guiding groove of the raceway. The nail-controller is shown as having a sliding gate extended from end to end thereof, said gate being represented as notched at its edge next the said grooves, the unnotched parts of said gate normally standing across the said grooves. The nails on their arrival at the bottom of the raceway are taken therefrom indiscriminately as to their heads and points by a device which, as herein represented, lifts the said series of nails, as provided for in said patent, said nails sliding from the said device or lifter into grooves of a raceway-terminal, and from said terminal the series of nails having their heads leading drop and enter the grooves of the nail-controller, while those nails stopped on the terminal point first cross and span the grooves and contact at their points with the edge of the gate, it occupying a position in accordance with the length of the nails being sorted. The nails leaving the raceway-terminal point first meet, preferably, the unnotched part of the edge of said gate and are arrested thereby, and to discharge those nails into the grooves of the nail-controller head first I move the gate automatically longitudinally until its notched parts come in line with the points of the nails, and immediately thereafter said nails slide on the terminal and their points entering the notches cause the heads of the nails previously sustained by the raceway-terminal to drop therefrom head first into the said grooves, the said heads dropping freely, owing to the fact that the points are temporarily arrested, and as the heads get well into the grooves the points slide off from the device which arrested them, as stated.

I believe that I am the first to use in a machine for assorting nails presented with their heads and points arranged indiscriminately a device which can be actuated to deliver a series of nails either head first or point first, as desired.

It will be noticed that my nail-controller may be moved when desired to discharge the nails either head or point first into pockets arranged in position to receive the nails coming from the nail-controller in either direction of its movement.

Figure 1, in side elevation, represents a sufficient portion of a nail-assorting apparatus which, taken in connection with the patent referred to, will enable this invention to be understood. Fig. 2 is a partial front or left-hand elevation of the apparatus shown in Fig. 1. Fig. 3 is a partial section in the line $x$, Fig. 2. Fig. 4 is a detail showing the nail-controller in cross-section, the gate having been slid to put a notch thereof in line with the point of a nail, the nail-controller having been moved to let the nail drop into the grooves of the controller. Fig. 5 is a detail to be referred to.

The raceway $c^\times$, the lifter $f$, connected with a rod $f'$, acted upon by a cam $f^2$, the terminal $h'$, made adjustable by a suitable screw $h^\times$, the continuously-rotating shaft $e$, (partially shown,) it having attached to it part of a clutch $e^\times$, which coöperates with a second clutch part $e'$ on a shaft $e^2$, the latter shaft carrying the cam $f^2$, are and may be all substantially as represented in the said patent.

One part of the invention herein to be described and claimed relates more especially to the nail-controller and means for operating it, whereby the nails therein may be discharged therefrom either end first.

Another part of the invention relates to a movable gate coöperating with a nail-controller to act as a stop, whereby by a relative movement between said controller and the gate the nails coming to the nail-controller point first are temporarily arrested, while the nails coming to it head first enter immediately the grooves therein, and thereafter said arrested point-first nails are made to enter the grooves of the nail-controller head first.

The controller A is represented as cylindrical in shape, it having end bearings in suitable stands erected on the framework $A^2$, the controller being provided with a series of nail-receiving grooves $a$. The controller has applied to it a sliding gate $a'$, represented as a bar having a series of notches $a^2$, the unnotched parts of the edge of said bar normally standing across the upper ends of said grooves, as represented in Fig. 2. The gate $a'$ has, as shown, a stud $a^3$ extended from it into a suitable slot in the controller, a spring $b$ in said controller acting upon the said stud to normally keep the gate in the position shown in Fig. 2; but this gate may be reciprocated in the direction of the arrow thereon whenever desired by or through the movement of the slide-rod $b'$, as will be described. The nail-controller coöperates with pockets $C^2$, and it is so located with relation to said pockets that the nails in the grooves of the controller may be discharged therefrom into the pockets. Each pocket herein shown is represented as having two feeding-mouths C and C', they being separated by a wall $B^2$, which at its upper end substantially contacts with the controller, said wall acting chiefly to prevent any undue springing of the controller and also overturning of short nails. The pockets $C^2$ are made in series side by side, one for each groove of the controller, and the lower ends of the pockets have connected to them a series of tubes $c^3$ of any usual or suitable nature, each tube receiving a nail and directing it to a nail-receiving hole in a nail-block or other nail-receiver to receive the nails. One of the journals of the controller has secured to it by a suitable adjusting-screw $c$ a gear D, which is engaged by a toothed sector D', connected with a lever $D^2$, mounted upon a stud $D^3$, the other end of said lever having a roller or other stud $c'$, which enters the groove $c^2$ of a cam-hub $D^4$.

The framework $A^2$ has a depending hanger E, upon which is pivoted at E' a bar $E^2$, provided with a pin $E^3$. Whenever this bar $E^2$ is lifted, the pin $E^3$ strikes the beveled lower end of a lever $E^4$ and turns said lever so that it, suitably connected with the slide-rod $b'$, actuates said slide-rod to move the slide-bar in the direction of the arrow on it, and at the same time a pin $f^\times$, carried by said bar $E^2$, meets an arm $f^{\times\prime}$ and raises it out of engagement with a stud $f^{\times 2}$, attached to a collar $f^3$, adjustably secured by a set-screw 2 (see Fig. 2) to the shaft $e^2$. The rising of the arm $f^{\times\prime}$ frees the said stud, so that a suitable spring, as $f^4$, in said shaft $e^2$ and abutting against a fixed abutment $f^5$, shown as a screw, causes the shaft $e^2$ to be moved in the direction of the arrow 3, Fig. 1, to engage the friction-clutch part $e'$ with the friction-clutch part $e^\times$, the latter thereby taking up and rotating the shaft $e^2$ for one rotation, at the end of which time the stud $f^{\times 2}$ has again by its contact with the arm $f^{\times\prime}$, which has been permitted to descend, drawn the shaft $e^2$ in the direction opposite said arrow 3 to open the clutch referred to and stop the further rotation of the shaft $e^2$.

In the operation of the machine let it be assumed that the raceway $c^\times$ has on it a series of nails $n$, with a nail in each groove of the raceway, the said nails being arranged indiscriminately heads and points first. The drawings show the lifter $f$ as elevated, that being the position in which the lifter stands when the shaft $e^2$ is at rest. When the lifter is started from its lowest position into the position shown in the drawings, it lifts a series of nails then in its grooves, and the said nails (marked $n'$ in Fig. 3) slide therefrom into the grooves of the terminal $h'$, continuing their movement to the controller, and the heads of all those nails which are head first as soon as they arrive at or near the unnotched part of the gate tip by gravity into the grooves $a$ and the heads rest against the interior of the upper part of the chute-mouth; but those nails which are point first are stopped with their points against the unnotched part of the gate, as in Fig. 3. The terminal $h'$ will be so adjusted on the part of the framework to which it is attached as to adapt it to the varying lengths of nails used, the proper position for the terminal being that at which a nail going head first down the raceway when it arrives at the edge of the gate will drop by gravity from said terminal head first into a groove of the controller. In this condition the rod or bar $E^2$ will be lifted, letting the clutch parts $e'$ and $e^\times$, referred to, engage, so that the shaft $e^2$ will be started, and with the rising of this bar the gate will be pushed in the direction of the arrow, Fig. 2, until its notched parts come in line with the points of the nails, when the latter will immediately slide sufficiently along into the grooves of the terminal to enter said notches, leaving the points of the nails extended somewhat over a shoulder $m$ (see Fig. 4) of the controller, and immediately thereafter the cam $D^4$ in its rotation will impart to the sector D' a slight movement in the direction of the arrow thereon, causing the gear D and the controller to be moved in the direction of the arrow on said gear, Fig. 1, such movement of the controller enabling the heads of the nails yet supported on the terminal to slide off said terminal and drop into the grooves $a$, as represented in Fig. 4, and thereafter the controller is moved in the opposite direction by or through the lever $D^2$ and cam $D^4$ until the lower ends of the grooves, they all having nails head first, come in line with the mouth C' of the chute, which permits the nails to drop from said grooves head first, as represented by dotted lines in Fig. 3, each nail entering one of the usual tubes to lead it to the point where it is desired to deposit it to be driven. I may after the nails have been deposited in the grooves head first deliver them all point first from the controller. To effect this, I have only to loosen the set-screw 2 and turn the collar $f^3$, having the stud $f^{\times 2}$, into a different position on the shaft $e^2$, so that it will stop the shaft $e^2$ when that part of the cam-groove $c^2$ of the hub $D^4$ which makes the greatest downthrow of the sector $D'$ is opposite the roller-stud $c'$ and to loosen the screw $c$, turning the controller or device A so that its journal is turned in the stationary gear D, thus bringing the gate into position to receive against it the points of the nails, as before described, and then I again tighten the screw $c$. In this condition the nails delivered from the terminals head first will drop, as before described, into the grooves and the nails delivered point first will stop with their points against the unnotched part of the gate, so that when the machine so adjusted is started the lever $D^2$ in engagement with the sector $D'$, fast on the controller, will turn the latter in the direction of the arrow near it, Figs. 1 and 4, for a distance sufficient to not only let the heads of the nails sustained on the terminal $h'$ leave the terminal and drop into a groove of the controller, but the said controller is further moved, due to the shape of the cam-groove $c^2$, in the same direction until all the nails then arranged in the groove of the controller, points in one direction, slide from said grooves point first into the receiving-mouth C.

Having described my invention, what I claim, and desire to secure by Letters Patent, is—

1. In a nail-assorting apparatus, the following instrumentalities, viz: a terminal to receive a series of nails with their heads and points arranged in grooves therein indiscriminately, a circularly-movable controller having a series of grooves to receive the nails leaving said terminal head first, a gate to receive against its edge the points of the nails leaving the terminal point first, and means to actuate said controller to carry said gate away from said terminal to thereby enable the heads of the nails on said terminal to drop therefrom into said grooves head first, substantially as described.

2. In a nail-assorting apparatus, the following instrumentalities, viz: a terminal to receive a series of nails with their heads and points arranged indiscriminately, a controller having a series of grooves into which the nails leaving the terminal head first enter by gravity, a notched gate carried by said controller and standing normally with the unnotched edge of the gate crossing said grooves to receive against it the points of the nails leaving the terminal point first, and means to move said gate to place its notches in position to be entered by the points of the nails, substantially as described.

3. In a nail-assorting apparatus, the following instrumentalities, viz: a terminal to receive a series of nails with their heads and points arranged indiscriminately, a controller having a series of grooves into which the nails leaving the terminal head first enter by gravity, a notched gate carried by said controller and standing normally with the unnotched edge of the gate crossing said grooves to receive against it the points of the nails leaving the terminal point first, means to move said gate to place its notches in position to be entered by the points of the nails, means to impart a circular movement to said controller, and a chute to receive the nails from said controller, substantially as described.

4. In a nail-assorting apparatus, the following instrumentalities, viz: a circularly-movable controller having grooves to receive a series of nails head first, a chute-mouth having two sets of nail-receiving passages, and actuating means to move said controller, said means containing provisions for moving said controller forwardly or backwardly to discharge said nails therefrom either head first or point first into one or the other of said passages as desired, substantially as described.

5. In a nail-assorting apparatus, a controller having a series of grooves, a notched gate arranged parallel therewith and crossing said grooves, means to impart circular motion to said controller combined with means to move said gate longitudinally on or with relation to said controller to place the notches of the gates alternately in line with and then out of line with relation to said grooves, substantially as described.

6. In a nail-assorting mechanism, means to guide and direct a series of nails with their heads and points arranged indiscriminately, a device to receive said series of nails therefrom at one operation, and means to actuate said device whereby it may be made to deliver said series of nails either head first or point first as may be desired.

7. In a nail-assorting machine, means to receive and guide nails, a double series of pockets, a nail controller or device located between the means to receive and guide the nails and the receiving ends of said double series of pockets, and means adapted by change of position to move said controller either forward or backward, as may be desired to discharge the nails in the grooves of the controller into said pockets head or point first, substantially as described.

8. In a nail-assorting machine, a lifting device to lift a series of nails having their heads and points arranged indiscriminately, a grooved terminal to receive and guide the nails deposited thereon from said lifting device, a circularly-movable nail-controller or device having grooves some of which receive nails which leave the terminal head first, and means to stop temporarily the nails leaving said terminal point first, and means to thereafter enable said nails to move somewhat longitudinally in order that their heads may be removed from the said terminals and dropped head first into the unoccupied grooves of said device, a plurality of series of pockets, and means to turn said device in one or the other direction as may be desired to deliver the nails either head or point first into one or the other of said series of pockets, substantially as described.

9. In a nail-assorting mechanism, a nail-controller, means to present to said controller nails having their heads and points arranged indiscriminately, a series of pockets on said controller, a device to arrest temporarily the points of those nails coming to the controller point first, means to actuate said device and said controller, whereby the pockets therein may be provided with nails with their points in one direction, and means for actuating said controller to deliver all the nails from its pockets either head or point first.

10. In a nail-assorting mechanism, a nail-controller having a series of nail-receiving grooves, and a guide arranged longitudinally thereof and adapted to arrest the nails coming to said controller point first, means to move said guide to allow the point-first nails to continue their movement, and means to move said controller to enable the arrested point-first nails to drop into the grooves of the controller head first.

In testimony whereof I have signed my name to this specification in the presence of two subscribing witnesses.

ALVIN D. ELLIOTT.

Witnesses:
GEO. W. GREGORY,
EDITH M. STODDARD.